(12) United States Patent
Bertagnolli, Jr.

(10) Patent No.: US 9,165,457 B1
(45) Date of Patent: Oct. 20, 2015

(54) DEVICES, SYSTEMS, AND METHODS FOR MULTIDIMENSIONAL TELEMETRY TRANSMISSION

(71) Applicant: Joseph Bertagnolli, Jr., Nashville, TN (US)

(72) Inventor: Joseph Bertagnolli, Jr., Nashville, TN (US)

(*) Notice: Subject to any disclaimer, the term of this patent is extended or adjusted under 35 U.S.C. 154(b) by 106 days.

(21) Appl. No.: 13/663,460

(22) Filed: Oct. 29, 2012

Related U.S. Application Data

(60) Provisional application No. 61/601,028, filed on Feb. 21, 2012.

(51) Int. Cl.
*G08C 19/00* (2006.01)
*G06K 9/00* (2006.01)
*G08C 25/02* (2006.01)

(52) U.S. Cl.
CPC .................................. *G08C 19/00* (2013.01)

(58) Field of Classification Search
USPC ..................... 340/870.09; 382/100
See application file for complete search history.

(56) References Cited

U.S. PATENT DOCUMENTS

| | | | |
|---|---|---|---|
| 2009/0106617 A1* | 4/2009 | Katis et al. ................... | 714/748 |
| 2010/0048242 A1* | 2/2010 | Rhoads et al. ............. | 455/556.1 |
| 2010/0169410 A1* | 7/2010 | Lund et al. ................... | 709/203 |
| 2011/0318717 A1* | 12/2011 | Adamowicz .................. | 434/127 |
| 2013/0012270 A1* | 1/2013 | Naftolin ........................ | 455/566 |

\* cited by examiner

*Primary Examiner* — Jack K Wang
(74) *Attorney, Agent, or Firm* — C. Allen Black, Jr.

(57) ABSTRACT

Disclosed are devices, systems and methods for transmitting multidimensional telemetry data comprising a geo-spatial parameter, a time parameter, a device parameter, and a sensor parameter.

20 Claims, 1 Drawing Sheet

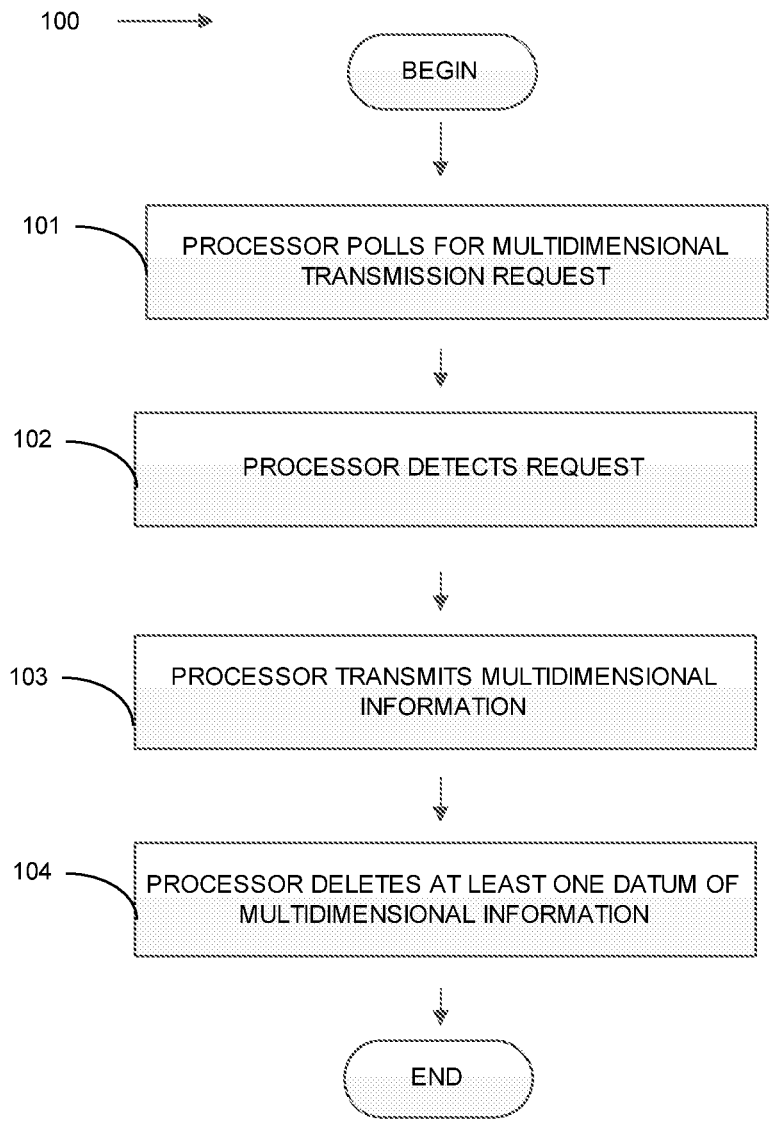

DEVICES, SYSTEMS, AND METHODS FOR MULTIDIMENSIONAL TELEMETRY TRANSMISSION

CROSS-REFERENCE TO RELATED APPLICATIONS

This application claims the benefit of U.S. Provisional Patent Application No. 61/553,061 filed Oct. 28, 2011 and U.S. Provisional Patent Application No. 61/601,028 filed Feb. 21, 2012, both of which are incorporated by reference in their entirety herewith.

BACKGROUND

Mobile communications devices such as cellular phones, smart phones, tablets, et alia have become commonplace. Dynamic data collection by such devices includes time, position, and additional local physical information such as images, sounds and other sensor data. While such information is immediately useful to the user, it can also be useful for other purposes, especially where such information can be accessed by third parties to assist the user either in real-time or assist the user at a later date, especially regarding contextual situations important to the user or third parties.

While telemetry systems exist for certain specific applications such as personal avalanche transmitters, these application-specific devices are of little use when the user cannot anticipate the need for such a device. Indeed, in unanticipated situations, it is often critical to obtain as much data as possible as it may be impossible to determine which specific data will be of relevance to third parties or even the user at some later date. While simple telemetry data such as position and time are of value, additional specific information, such as video, photographs and sound can be especially valuable in situations where the user or someone nearby may be lost, imperiled, injured, or under threat, and the user's attention to the situation, not the device, is critical. As such, there is a need for devices, systems and methods for transmitting multidimensional telemetry data.

SUMMARY

Disclosed are devices, systems and methods transmitting multi-dimensional telemetry data. Such systems, methods and devices comprise initiating a system for transmission of telemetry data at the request of the user, an interested third-party, or other entity. In certain embodiments, the disclosure provides for transmission of multidimensional telemetry data from a mobile electronic communications device. Such an electronic communications device may be a dedicated device or a general purpose device such as a mobile device, including for example, a cellular phone, smart phone, tablet, laptop, or other device. The systems, methods and devices disclosed herein are to be available to a user who may experience a need for such systems, methods, and devices, despite being unable to predict when or where such a need would occur.

In certain embodiments, the systems disclosed herein transmit data comprising multiple dimensions related to the identity, position and surroundings of a device and a user including dynamic data such as position, time, distance, photographic images and sounds, as well static data including, for example, device information, user information, and other relevant information. In certain embodiments, the devices, systems and methods described herein transmit multidimensional telemetry data to emergency responders and other interested third parties such as parents. Initiation of transmission of multidimensional telemetry data can be at a device user's request, a third party request, or an automatic processor request for such data, et alia.

In certain other embodiments, a multidimensional telemetry system as disclosed herein includes an application comprising computer readable instructions made operable by loading the instructions into a processer or otherwise present as firmware in the memory of a device so that a user or third party may quickly activate the system to transmit telemetry data. Such a system can "run the background" and is capable of rapid activation without requiring loading of the program into a processor prior to use. A user in need of the systems disclosed herein may in certain embodiments activate the telemetry system in a time of peril to self or others by pressing a button (real or virtual), motioning the device in a predetermined manner, or using a voice command thereby requesting the processor to initiate the methods and systems disclosed herein. Upon activation of the systems, methods, and devices disclosed herein, a device can transmit multidimensional telemetry data including, but not limited to photographic images, video, sound recordings, user information, spatio-temporal information, and any other information.

Without being bound to any specific embodiment, multi-dimensional data may be sent to a receiver including, but not limited to, a user account such as an email address, a database, another device, emergency services, or any other system, service or person. The systems disclosed herein may include receiver systems, devices, and methods designed to archive multi-dimensional telemetry data, process such telemetry data, as well as forward such data or data subsets to relevant entities, databases, services and accounts.

While receipt of a transmission may provide additional advantages to the disclosed embodiments, reception of transmission is not necessary for operation of the disclosed devices, systems and methods. Indeed, it is contemplated that in certain emergency situations, an attacker observing the user activating the disclosed systems may deter, mitigate, or otherwise cause discontinuance of an assault. For example, by pointing a mobile communications device or its camera at a person who is perceived as a threat, the user may obtain a benefit from the disclosed systems, methods and devices without the need to effect transmission of telemetry data.

In certain other embodiments, additional processes may be initiated before, in conjunction with, or subsequent to transmission of multidimensional telemetry. Additional processes include initiation of phone calls, messaging, alarming, flashing or other communications or tracking protocols designed to notify third parties or otherwise assist the user when the disclosed systems are initiated. In certain embodiments where static or dynamic data may be recorded to a transmission device, such data can be automatically deleted from the device or encrypted after transmission thereby preventing unauthorized use or access of such data obtained from the device.

BRIEF DESCRIPTION OF SEVERAL VIEWS OF THE DRAWINGS

FIG. 1 illustrates an exemplary system for providing multidimensional telemetry data according to an embodiment of the present disclosure.

DETAILED DESCRIPTION

Disclosed are devices, systems and methods for transmitting multi-dimensional telemetry data. Devices disclosed herein include dedicated devices and mobile electronic communications devices including for example cellular phones, smart phones, tablets, laptops, or other devices that can be present at a position and time that a user or third party may experience a need for the system and methods disclosed herein. The disclosed devices, systems and methods transmit dynamic data which can change over time such position, altitude, time, and distance to a telemetry receiver, as well as transmitting other dynamic data such as photographic images, video, and sounds. Such dynamic telemetry data may be combined and transmitted with static data including, for example, device information, network identification information, user information, and other relevant information.

As used herein, the term "telemetry data" is to be construed broadly to include any contemporaneously transmitted information from a device relevant to its identity, its position in time or space, i.e., spatio-temporal data, as well as its user's identity, among others. Identification information includes, but is not limited to, user specific information such as name, address, telephone number, emergency contact information, and medical information as well as device specific information such as serial number, network identification number, IP address, distance from communication relay systems including satellites, electronic receivers and cell phone towers, et alia. Spatio-temporal information comprises information obtained by the device relative to its position in time and space that includes, but is not limited to geo-spatial coordinates, GPS position, time, latitude, longitude, altitude, as well as local sensor data such as that obtained by CCDs, cameras, microphones and accelerometers or other sensors that may be present in the device. The telemetry data is not limited to any configuration or mechanism and may be collected, compiled or processed by any device as disclosed herein or known in the art using the systems and methods disclosed herein.

The term "multidimensional" telemetry data or dataset is to be construed as not less than three data points contemporaneously associated with at least three parameters unique to a device or user including, the time, the device's position, and identification information unique to the device. More specifically, a multidimensional dataset comprises at least a geo-spatial parameter, a time parameter, and a device identification parameter, but is not limited to just these three parameters. For example, a 5-dimensional telemetry data set could include, but would not be limited to, the following dynamic parameters: 1) geo-spatial position (e.g. GPS coordinates), 2) time, 3) photographic images obtained from device camera; and the following static parameters 4) user name, and 5) device serial number. The embodiments disclosed herein contemplate at least two, three, four, five, six, seven, eight, nine, ten, or even more dimensions to be transmitted at least once.

Multidimensional telemetry data as transmitted by the devices, systems and methods described herein may be parsed, combined, processed or transmitted in any combination that is advantageous to a user, interested third party, emergency responder or any other entity. The data can be transmitted as raw data or processed and transmitted as compiled information such as relative location of the device from receiving systems or emergency response units or stations. The operation of the systems, methods, and devices disclosed herein are not dependent on any particular arrangement or ordering of data for transmission.

In certain embodiments, telemetry data may be recorded to a device prior to transmission. However, such data may be encrypted or deleted from the device thereby denying such information to persons and entities not authorized to access such information. Deletion of data includes but is not limited to overwriting memory registers, deletion of data pointers, volatile data erasure, or any other means removing information from a device. Encryption of data may be by any means disclosed herein or known in the art.

In certain non-limiting embodiments, the systems, devices and methods disclosed herein may also comprise a receiver system or receiver device of multidimensional telemetry data including but not limited to a database, an email account, or other receiver systems and combinations thereof. The receiver systems are designed to allow a user or other interested party to access transmitted telemetry data at a later date as well as provide emergency responders, parents and loved ones, as well as legal authorities with both notice of the systems activation and the telemetry data transmitted by the system.

In certain embodiments, the systems, methods and devices disclosed herein can be used to assist a device user in response to a perception of a peril for self or others. Without limitation, users may obtain the benefits described herein by using the disclosed methods, devices and systems in response to themselves or others becoming lost, being injured, threatened with bodily harm, perceiving an emergent physical danger, or otherwise being injured, threatened or imperiled. The devices, methods, and systems may similarly be used to provide useful information to parents, loved ones, emergency responders, the courts or other persons and entities rendering assistance, aid or support. While it is contemplated that the devices, systems and methods disclosed herein are capable of user-initiated activation, i.e., "telemetry push," it is also contemplated that remote activation be enabled in certain embodiments, i.e., "telemetry pull," as well as combinations thereof.

In certain other embodiments, the disclosed systems, methods and devices activate or otherwise communicate with additional systems including activating a flash or other visual alert and/or a sound alert from the device. While such warning systems may deter an attack, it is also contemplated that when an attack is not deterred, the telemetry data can be transmitted to those rendering assistance as well as be available to law enforcement and the courts to identify and prosecute offenders post hoc. As such, the safety advantages of the disclosed systems, methods, and devices are manifold and not limited to use for any pre-determined threat, danger or peril.

FIG. 1 presents a simplified non-limiting embodiment of a multidimensional data transmission system 100 wherein a device processor polls for activation request 101, that upon receiving a request 102, transmits telemetry data 103, and subsequently deletes at least one datum of the data from the device 104.

In some embodiments, the systems and methods disclosed herein comprise an application designed to operate in conjunction with a specific user interface (UI) application. The UI application interfaces with an operating system (OS) to in order to facilitate user interaction with a device. In some embodiments, the operating system is one of Symbian OS, Microsoft® Windows® Mobile OS (available from Microsoft Corporation of Redmond, Wash.), Palm® webOS™ (available from Palm Corporation of Sunnyvale, Calif.), Palm® OS (available from Palm Corporation), RIM® BlackBerry® OS (available from Research In Motion Limited of Waterloo, Ontario, Canada), Apple® iPhone® OS (available from Apple Corporation of Cupertino, Calif.), or Google™ Android™ OS (available from Google of Mountain View, Calif.). These operating systems are merely exemplary of the operating systems that can be used in accordance with the embodiments disclosed herein. Other operating systems are contemplated.

In certain embodiments mobile electronic communications devices include a display for displaying multimedia such as, for example, maps, nearest available assistance point, text, etc., and other geo-information, application graphical user interfaces (GUIs), text, images, video, telephony functions such as Caller ID data, 911 call buttons, setup functions, menus, metadata, messages, wallpaper, graphics, Internet content, device status, preferences settings, map and location data, and the like. The mobile communications devices also include a processor for controlling, processing data, and/or executing computer-executable instructions of one or more applications, and a memory for storing data and/or one or more applications. The applications are stored in the memory and/or in a firmware and can be executed by the processor. The firmware can also store code for execution during device power up, for example. The communications component interfaces with the processor to facilitate wired/wireless communications with external systems. Example external systems include, but are not limited to, intranets, network databases, network storage systems, cellular networks, location systems, Voice over 25 Internet Protocol (VoIP) networks, local area networks (LAN s), wide area networks (WANs), metropolitan area networks (MANs), personal area networks (PANs), and other networks. In some embodiments, the external systems are implemented using WIFI, WIMAX, combinations and/or improvements thereof, and the like. In some embodiments, the communications component includes a multimode communications subsystem for providing cellular communications via different cellular technologies. In some embodiments, for example, a first cellular transceiver operates in one mode, such as, Global System for Mobile communications (GSM), and an Nth transceiver operates in a different mode, such as Universal Mobile Telecommunications System (UMTS). It should be appreciated that a plurality of transceivers can be included. Include are transceivers for use by other communications technologies such as, for example, WIFI, WIMAX, BLUETOOTH, infrared, infrared data association (IRDA), near field communications (NEC), RF, and the like. In some embodiments, the communications component also facilitate reception from terrestrial radio networks, digital satellite radio networks, Internet-based radio services networks, combinations thereof, and the like. The communications component can process data from a network such as, for example, the Internet, an intranet (e.g., business intranet), a home broadband network, a WIFI hotspot, and the like, via an ISP, DSL provider, or broadband provider. In some embodiments, the communications component facilitates the transmission of authentication information from the mobile communications device to a network for processing in accordance with the methods described herein.

A mobile communications device may also include an image capture and processing system (image system). Photos and/or videos can be obtained via an associated image capture subsystem of the image system, for example, a camera. A mobile communications device may also includes a video system for capturing, processing, recording, modifying, and/or transmitting video content. A mobile communications device may also includes a location component for sending and/or receiving signals such as, for example, GPS data, assisted GPS (A-GPS) data, WIFI/WIMAX and/or cellular network triangulation data, combinations thereof, and the like, for determining a location of the mobile communications device. In some embodiments, the location component interfaces with cellular network nodes, telephone lines, satellites, location transmitters and/or beacons, wireless network transmitters and receivers, for example, WIFI hotspots, radio transmitters, combinations thereof, and the like. In some embodiments, the location component retrieves location information at the request from a location services application (LSA).

Using the location component, the mobile communications device obtains (e.g., retrieves, receives, and/or generates, etc.) data to identify its location, or transmits data used by other devices to determine the mobile communications device location. Although connections are not shown between the components, the components can interact with each other to carry out system functions. It should be understood that FIG. 1 and the descriptions herein are intended to provide a brief, general description of a suitable environment in which the various aspects of some embodiments of the present disclosure can be implemented.

The steps of the disclosed methods are not necessarily presented in particular order and performance of some or all the steps in an alternative order is possible and is contemplated. The steps have been presented in the demonstrated order for ease of description and illustration and may be performed simultaneously without departing from the scope of the appended claims. It should also be understood that the illustrated methods can be ended at any time. In certain embodiments, some or all steps of this process, and/or substantially equivalent steps are performed by execution of computer-readable instructions stored or included on a computer-readable medium, such as the memory of a mobile communications device, for example.

Other modifications and embodiments of the invention will come to mind in one skilled in the art to which this invention pertains having the benefit of the teachings presented herein. Therefore, it is to be understood that the invention is not to be limited to the specific embodiments disclosed. Although specific terms are employed, they are used in generic and descriptive sense only and not for purposes of limitation, and that modifications and embodiments are intended to be included within the scope of the appended claims.

What is claimed is:

1. A mobile emergency alert telemetry system, the system comprising:
a transmission device including a processor and a memory storing instructions executable by the processor to make the transmission device operable to:
push multidimensional telemetry including at least a time parameter, a geospatial parameter, a device identification parameter, and a device sensor parameter, wherein the sensor parameter comprises data selected from the group consisting of photographic data, video data, sound data and combinations thereof, further wherein the sensor parameter data is recorded, transmitted to alert an emergency responder, and then automatically deleted.

2. The system of claim 1, wherein the transmission of multidimensional telemetry is initiated upon a local user-initiated push request.

3. The system of claim 2, wherein the push request is input via a real or virtual button on the device.

4. The system of claim 3, wherein a memory storing instructions executable by the processor to make the transmission device operable comprises additional instructions to a processor to initiate an alarm selected from the group consisting of flashing, audible alarming, vibrating, and combinations thereof upon the push request.

5. The system of claim 4, wherein a memory storing instructions executable by the processor to make the transmission device operable comprises instructions to automatically initiate a telephone call to 911 upon a push request.

6. The system of claim 5, wherein the transmission device is a cellular phone.

7. The system of claim 1, wherein the transmission device transmits telemetry data to a database.

8. A method of providing personal protection, comprising a mobile device recording telemetry comprising at least a time parameter, a geospatial parameter, a device identification parameter, and a sensor parameter; transmitting the telemetry from the device to an emergency responder; and deleting the sensor parameter after transmission.

9. The method of claim 8, wherein the sensor parameter comprises data selected from the group consisting of photographic data, video data, sound data and combinations thereof.

10. The method of claim 9, wherein the transmission of telemetry is initiated upon a local user-initiated push request.

11. The method of claim 10, wherein the push request is input via a real or virtual button on the device.

12. The method of claim 11, wherein the transmission of telemetry occurs contemporaneously with an alarm from the device selected from the group consisting of flashing, audible alarming, vibrating, and combinations thereof.

13. The method of claim 12, wherein the transmission of telemetry occurs contemporaneously with initiation of a telephone call from the device to 911.

14. The method of claim 13, wherein the transmission device is a cellular phone.

15. The method of claim 8, wherein the transmission device transmits telemetry data to a database.

16. A mobile electronic device, comprising a processor and a memory storing instructions executable by the processor to make the device operable to:
   transmit multidimensional telemetry including at least a time parameter, a geospatial parameter, a device identification parameter, and a device sensor parameter further wherein the sensor parameter data is recorded, transmitted to alert an emergency responder, and then automatically deleted.

17. The device of claim 16, wherein the sensor parameter comprises data selected from the group consisting of photographic data, video data, sound data and combinations thereof.

18. The device of claim 17, wherein the instructions comprises additional instructions to the processor to initiate an alarm selected from the group consisting of flashing, audible alarming, vibrating, and combinations thereof.

19. The method of claim 18, wherein the transmission of telemetry is initiated upon a local user-initiated push request.

20. The device of claim 19, wherein the mobile communications device is a cellular phone.

* * * * *